Sept. 10, 1974   J. A. DODD, JR., ET AL   3,834,905
METHOD OF MAKING ELLIPTICALLY OR RECTANGULARLY
GRADED PHOTOPRINTING MASTERS
Filed May 23, 1973   7 Sheets-Sheet 1

United States Patent Office 3,834,905
Patented Sept. 10, 1974

3,834,905
METHOD OF MAKING ELLIPTICALLY OR RECTANGULARLY GRADED PHOTOPRINTING MASTERS
John Alton Dodd, Jr., Haddonfield, N.J., and Raymond Fujio Okamoto, Glenside, Pa., assignors to RCA Corporation
Filed May 23, 1973, Ser. No. 363,298
Int. Cl. G03c 5/09
U.S. Cl. 96—27 E
12 Claims

ABSTRACT OF THE DISCLOSURE

A method is provided for making a graded photoprinting master. The photoprinting master is photographically produced from a first master by contact printing the first master upon a photosensitive layer including varying the degree of exposure of the photosensitive layer by exposing the first master to light passing through means for varying exposure in a circular manner and through means for varying exposure in a linear manner.

BACKGROUND OF THE INVENTION

The present invention relates to methods of making a multiple photoprinting master having graded dot or line sizes, from which graded apertured masks for cathode-ray tubes can be produced.

Cathode-ray tubes for use in color television usually include a screen of red, green and blue emitting phosphor lines or dots, electron gun means for exciting the screen, and an apertured mask interposed between the gun means and the screen. The apertured mask is a thin metal sheet precisely disposed adjacent to the screen so that the mask apertures are systematically related to the phosphor lines or dots.

The apertured mask is usually made by coating both sides of a thin flat steel sheet with a photosensitive material, exposing each side of the sheet through a photoprinting master having an opaque dot or line pattern corresponding to the mask apertures desired, developing the photosensitive material to remove the unexposed portions, and then etching the sheet to form the mask apertures. Subsequently, the flat apertured mask is pressed into a desired curvature (e.g., spherical).

It is conventional to use an apertured mask having graded apertures of different diameters or widths decreasing in diameter or width outwardly from a maximum at the center of the mask, as disclosed and claimed in Morrell Pat. 2,755,402, issued July 17, 1956. The Morrell patent describes a method of making a photoprinting master for a graded mask wherein a photographic print is made by exposing a mask having uniform size apertures to parallel light rays passing through an optical filter having a transparency that varies from a maximum at the center to a minimum at the outer edge.

Another method involves making a photographic print of a mask having uniform size apertures by exposing the mask to a point source of light located relatively close to the mask and relying on the inverse square law and the geometry to produce the variation in light intensity from the center outward, required to produce the desired variation in aperture size.

Still another method of making a graded photoprinting master is disclosed in U.S. Pat. No. 3,674,488 issued to Dodd et al. on July 4, 1972. In the Dodd et al. patent, a graded photoprinting master is made by: providing a first master comprising a multiplicity of spaced opaque dots of uniform size located in a desired array on a printed background; contact printing the first master to produce a second master comprising a negative replica thereon having spaced clear areas of the same size as the dots on an opaque background; contact printing the second master through a rotating shutter having a specially-shaped aperture for varying the time of exposure from a maximum at the center to a minimum at the outer edge, to produce a third master having spaced clear or opaque areas of graded size on a respective opaque or clear background.

In the preceding Dodd patent, the resultant grading in the third master varies radially about the center of the master. However, grading other than circular is often desirable to vary aperture diameter or width so that the apertures of equal diameter or width form either an elliptical or rectangular contour about the center of the mask. The major advantage obtained from utilizing these different grades is the production of a more uniform color television picture tube.

SUMMARY OF THE INVENTION

A method is provided for making a graded photoprinting master. The photoprinting master is photographically produced from a first master by contact printing the first master upon a photosensitive layer including varying the degree of exposure of the photosensitive layer by exposing the first master to light passing through means for varying exposure in a circular manner and through means for varying exposure in a linear manner.

DETAILED DESCRIPTION

Figures 1, 2:
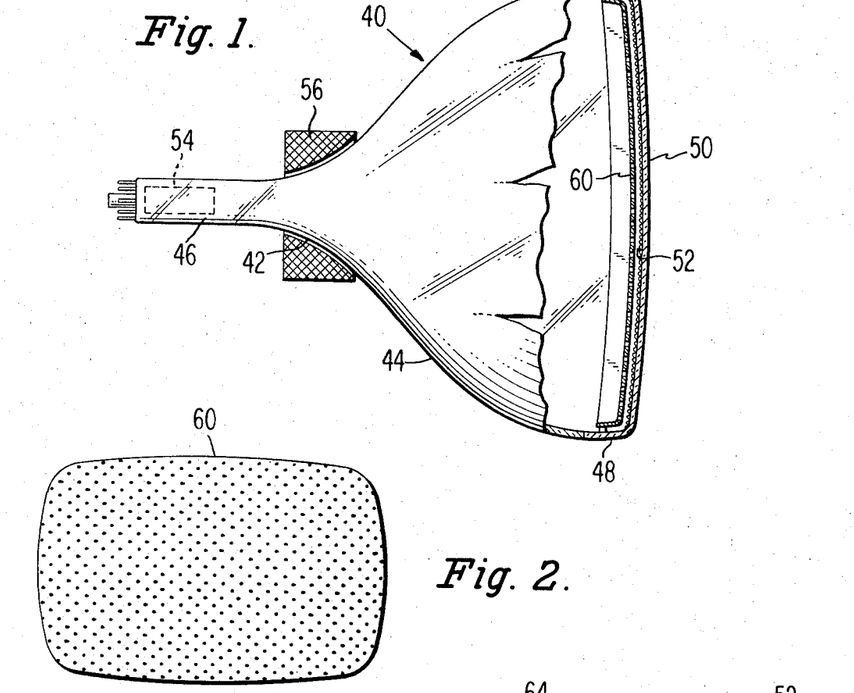
FIG. 1 is a side view of a color television picture tube.
FIG. 2 is a front view of the apertured mask of FIG. 1.

FIG. 1 depicts a color television picture tube 40. The tube 40 is comprised of an evacuated envelope 42 having three sections: a funnel portion 44, a neck portion 46 and an end cap 48. The end cap 48 includes a viewing faceplate 50 that is interiorly coated with a color phosphor screen 52. An electron gun 54, positioned within the neck portion 46, is adapted to project at least one, but preferably three electron beams through a magnetic deflection yoke 56 toward the screen 52. When suitably energized, the yoke 56 causes the beams to scan the screen 52 in a rectangular raster.

The screen 52 either may be composed of a plurality of tangent phosphor dots or a plurality of parallel phosphor strips or lines. The lines or dots comprise successive strips or circular deposits, respectively, of red emitting, green emitting, and blue emitting phosphors. Although, hereinafter, several embodiments of the present invention are described with respect to a dot screen, it should be noted that the scope of the present invention also includes embodiments that use line screens.

To produce color selection in the tube 40, an apertured mask 60 is mounted within the end cap 48 adjacent the screen 52 and is thereby interposed in the path of the electron beams projected from the gun 54. Only the portions of the electron beams that pass through the apertures of the mask 60 strike the screen 52.

Figure 3:
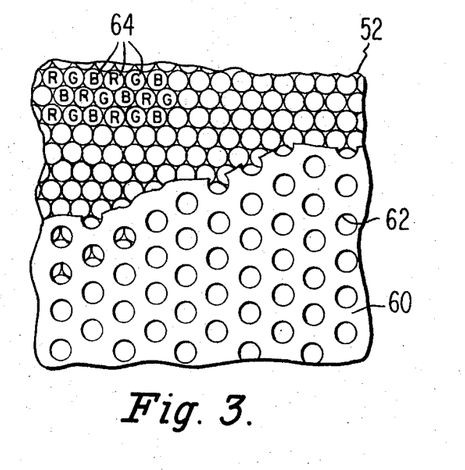
FIG. 3 is a fragmentary section of the mask of FIG. 1.
Figure 4:
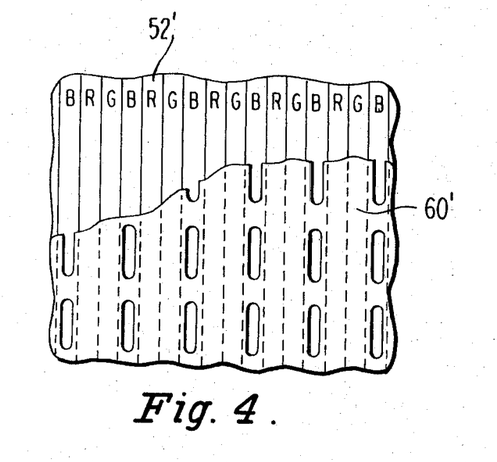
FIG. 4 is a fragmentary section of another embodiment of the mask and screen of FIG. 1.

FIG. 2 shows a front view of the apertured mask 60 and FIGS. 3 and 4 are respective enlarged partial views of a mask 60 having round apertures 62 adjacent a screen 52 having circular dots 64 and a mask 60' having slit apertures 62' adjacent a line screen 52' having successive strips 64' of blue, red and green emitting phosphors.

Figure 5:
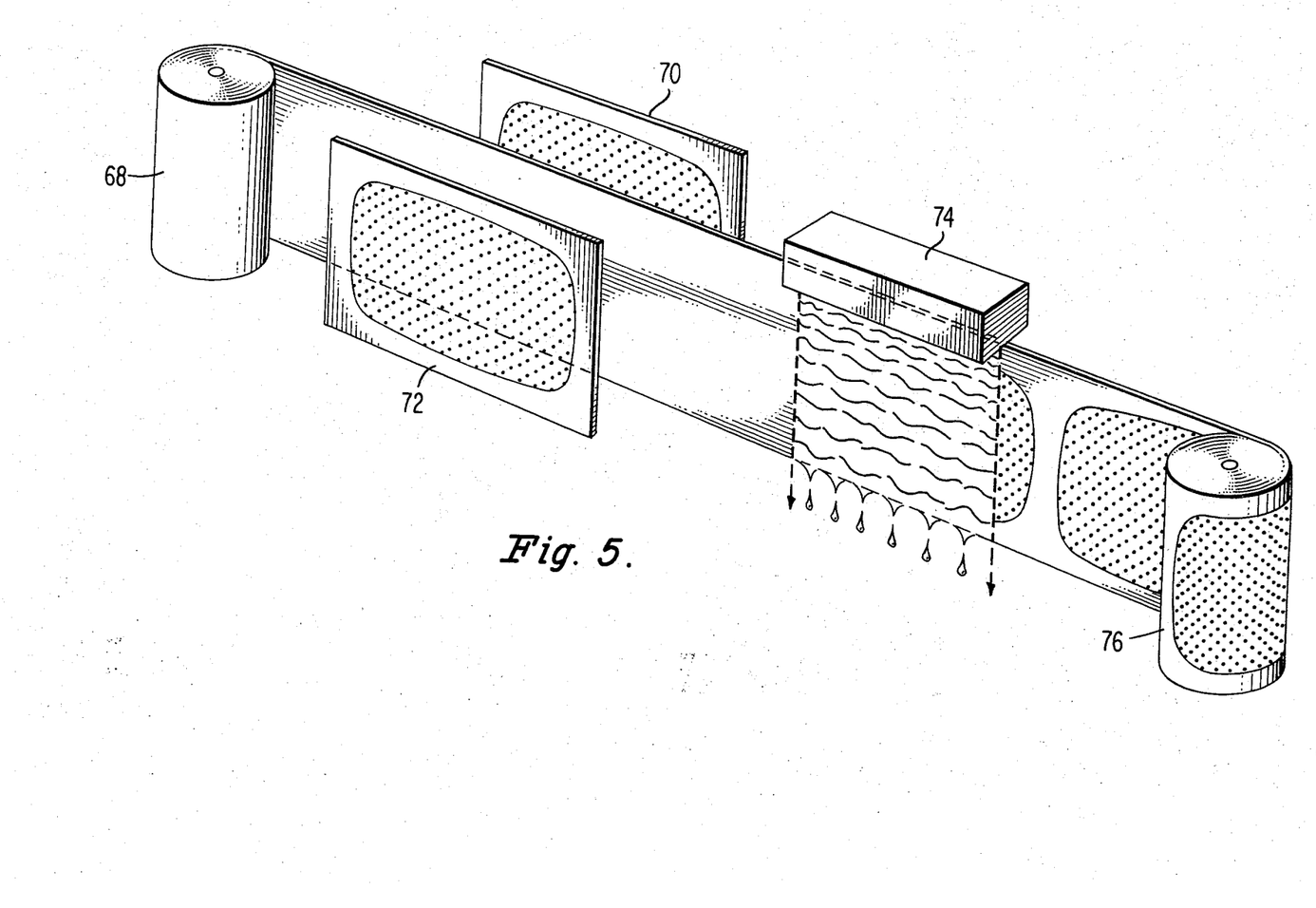
FIG. 5 is a perspective view of the processing of apertured masks.

A typical process for forming the mask 60 is illustrated in FIG. 5. A thin metal sheet 66, coated with a photosensitive emulsion, is fed from a roll 68 between two photoprinting masters 70 and 72. Each mashed contains a pattern of dots, corresponding to the intended location of apertures in the mask. The size of the dots may be larger in one master than in the other so that the resultant apertures have sloping sides. After a portion of the sheet 66 is exposed on opposite sides by suitable light sources (not shown), it traverses an etching stage 74 which removes the dot areas previously exposed. Finally, the etched sheet is wrapped on a second roll 76 and stored until subsequent processing into final masks.

The present invention provides a method of making the two photoprinting masters 70 and 72. In the description of the method and its several embodiments, certain terms are used which are defined as follows.

A grade contour is a line of equal size opaque or transparent areas that establish a dot or line pattern.

A grade is a plurality of concentric similarly shaped grade contours.

An elliptical grade is a grade having a predominant number of elliptical grade contours.

A rectangular grade is a grade having a predominant number of rectangular grade contours.

A linear grade is a grade having a predominant number of grade contours which are straight lines or slightly curved lines.

A modified rectangular grade is a grade which is intermediate between an elliptical grade and a rectangular grade but is closer to that of the rectangular grade.

A modified elliptical grade is a grade intermediate between an elliptical grade and a rectangular grade but is closer to an elliptical grade.

A positive grade is a grade in which the size of the dots or lines decreases from the center of the array to the edge of the array.

A negative grade is a grade in which the size of the dots or lines increases from the center of the array to the edge of the array.

Artwork is suitably prepared positive or negative plate having patterned array thereon.

A positive master is one having opaque areas or dots on a transparent background.

A negative master is one having transparent areas on an opaque background.

A positive type emulsion is one, such as Kodak Autopositive Emulsion, in which the exposed areas become clear or transparent upon development, and the unexposed areas remain opaque.

A negative type emulsion is one, such as Kodak Ortho PFO Emulsion, in which the unexposed areas become clear upon development and the exposed areas are opaque.

Figure 6:
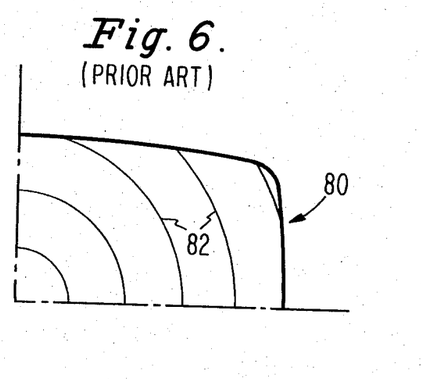
FIG. 6 is a view of an upper right quadrant grading contour of a prior art apertured mask having circular grading.
Figure 7:
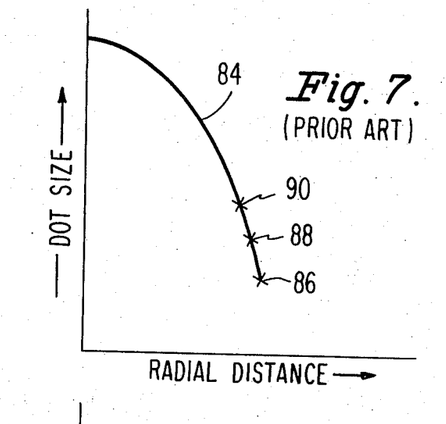
FIG. 7 is a grading curve for the prior art circular graded mask of FIG. 6.

FIG. 6 is a contour diagram of the upper right quadrant of a typical prior art tube mask 80. This prior art mask 80 has aperture size graded circularly outwardly from the center from the mask as shown by the grade contours 82. A grading curve 84 for the mask 80 is shown in FIG. 7 wherein the vertical axis represents dot size and the horizontal axis indicates radial distance from the tube center. Three data points, 86, 88 and 90 are shown on the curve of FIG. 7. The bottom point 86 represents the edge of the diagonal, the middle point 88 represents the edge of the major axis and the top point 90 represents the edge of the minor axis. Although the graded prior art mask 80 provides a considerable improvement in picture uniformity than previously obtained from non-graded masks, even greater improvement in uniformity can be achieved by using elliptical, modified elliptical or modified rectangular grading.

Figure 8:
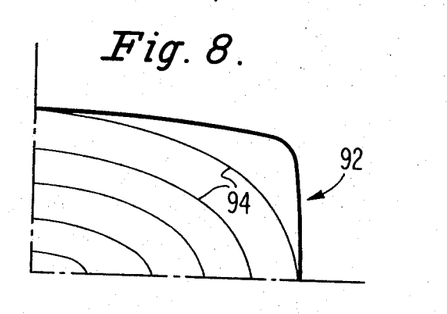
FIG. 8 is a view of an upper right quadrant grading contour of an apertured mask having elliptical grading.
Figure 9:
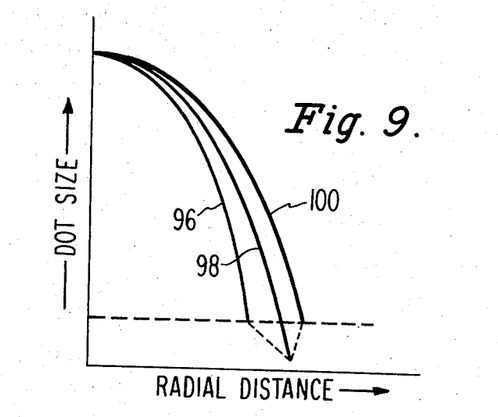
FIG. 9 is a grading curve for the elliptical graded mask of FIG. 8.

FIG. 8 shows a mask 92 having grading contours 94 made possible by an embodiment of the present invention. In this particular mask, an elliptical grading is shown wherein each aperture lying on a particular grading contour line is of equal size. The grading curve of the mask 92 is shown in FIG. 9. Again, the vertical axis in this figure represents increasing dot size and the horizontal axis represents radial distance from the tube center. The bottom curve 96 of this figure indicates the minor axis, the middle curve 98 indicates the diagonal and the top curve 100 indicates the major axis. As can be seen, dot size at the end of both the minor and the major axis are equal.

Figure 10:
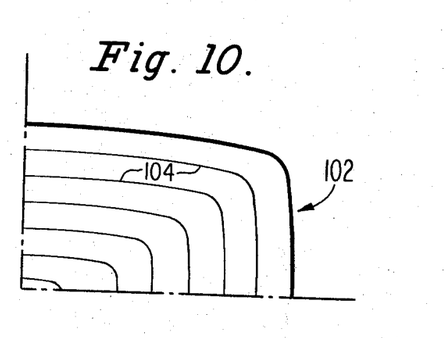
FIG. 10 is a view of an upper right quadrant grading contour of an apertured mask having rectangular grading.
Figure 11:
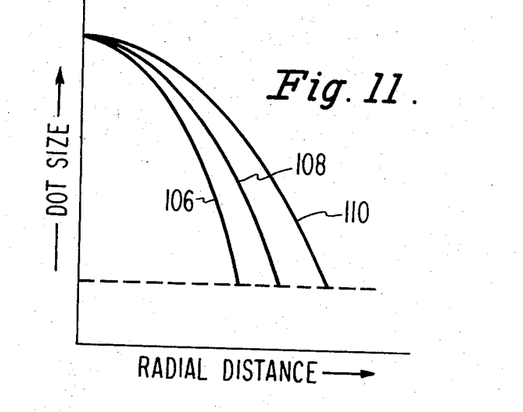
FIG. 11 is a grading curve for the rectangular graded mask of FIG. 10.

FIG. 10 shows a rectangularly graded mask 102 also obtainable by an embodiment of the present invention. In this figure, the grading lines 104 are contoured to fit the general shape of the rectangular mask 102. The grading curves of this mask 102 are shown in FIG. 11 wherein the curves represent, respectively, from left to right, the minor axis curve 106, the major axis curve 108, and the diagonal curve 110.

It has been found that the size of dots or lines of an artwork can be increased or decreased during contact printing by the amount of light exposure the artwork receives. For example, increasing either the light intensity or the duration of an exposure will increase the size of the dots. Therefore, by varying the exposure to different parts of an artwork, dot size can be controlled.

In general, the present invention achieves an elliptical grade by combining photographic exposures through circular grading and linear grading devices. The circular grading device effectively varies the exposure of a uniform negative artwork concentrically from the center of the artwork. Linear grading is achieved by varying the exposure parallelly from an axis that passes through the center of the artwork. Therefore, it can be seen, that the procedure for obtaining the elliptical grade is analogous to a technique of producing an elipse from a flattened circle, in which the ordinants in the circle are diminished in a constant ratio.

Figure 12:
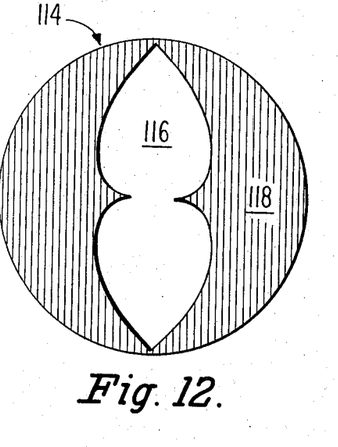
FIG. 12 is a plan view of one form of a rotatable shutter.
Figures 13, 14:
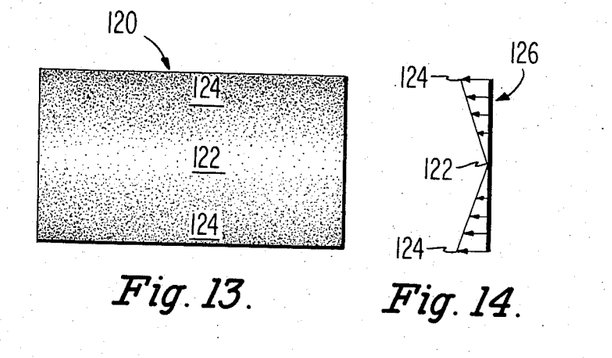
FIG. 13 is a plan view of a neutral density filter.
FIG. 14 is a density curve for the filter of FIG. 13.

One means of attaining circular grade is shown in FIG. 12. This means comprises a rotatable shutter 114, having a clear transparent butterfly-shaped pattern 116 surrounded by an opaque portion 118. The butterfly-shaped pattern 116 provides essentially linear circular grading outwardly from the center of the shutter. The use of a butterfly pattern for grading is disclosed in U.S. Pat. 3,698,903 issued to Dodd et al. which is hereby incorporated by reference. A method of obtaining a linear grading utilizes a neutral density filter 120 shown in FIG. 13. This filter varies in opaqueness from clear on a central horizontal axis 122 to increased opaqueness at the edges 124. Such grading is shown in the diagram 120 of FIG. 14, wherein the length of each arrow indicates the degree of opaquneness of the filter 120.

Figure 15:
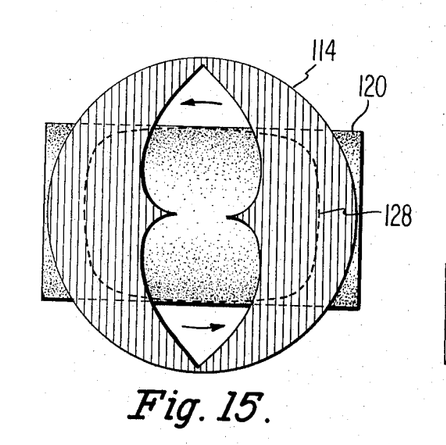
FIG. 15 is a plan view of an exposure combination using the shutter of FIG. 12 and the filter of FIG. 13.

A negative artwork can be exposed either in separate steps through the rotating shutter and through the neutral density filter or the filter and shutter can be combined as shown in FIG. 15 in exposing the artwork simultaneously. In FIG. 15, the outline of the mask pattern on the artwork is shown in dashed lines 128.

Figure 16:
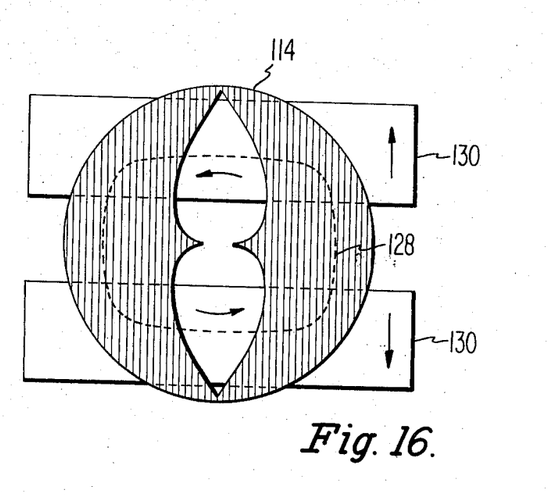
FIG. 16 is a plan view of an exposure combination using the shutter of FIG. 12 and two movable blades.
Figure 17:
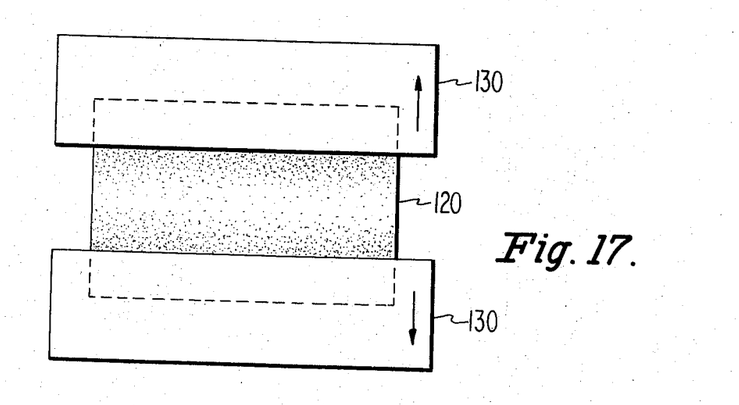
FIG. 17 is a plan view illustrating how two blades are used to form the neutral density filter of FIG. 13.

Another means for producing an elliptical contour is shown in FIG. 16. In this means, the neutral density filter 120 is replaced by two linearly moving blades 130 which moves outwardly as the shutter 114 rotates. These blades 130 can also be used to produce the neutral density filter 120 as shown in FIG. 17, wherein the area of the filter along the central horizontal axis 122 receives a maximum exposure and the two horizontal edges 124 receive minimum exposure since they are covered by the blades the greatest amount of time. It is again emphasized that the various circular grading and linear grading devices shown can either be used simultaneously or in consecutive exposures.

Figure 18:
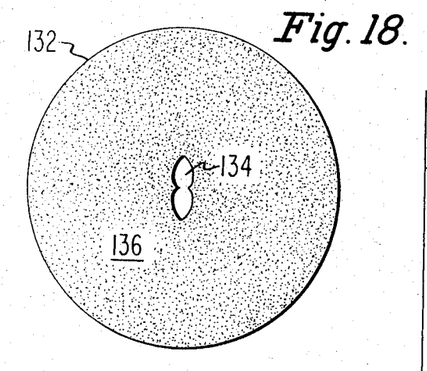
FIG. 18 is a plan view of another form of a rotatable shutter.
Figure 19:
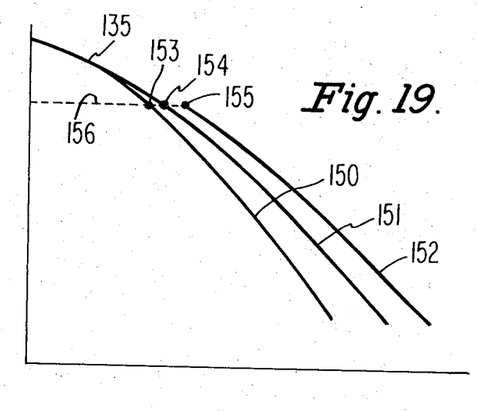
FIG. 19 is a grading curve of an artwork produced by a small central circular grade over a rectangular grade produced by four blades.
Figure 20A:
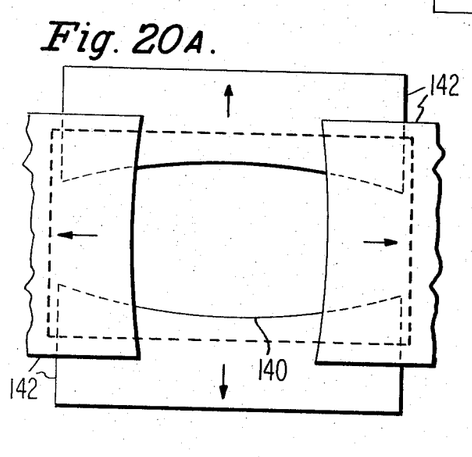
FIG. 20A is a plan view of four movable blades for forming a neutral density filter shown in an open position.
Figure 20B:
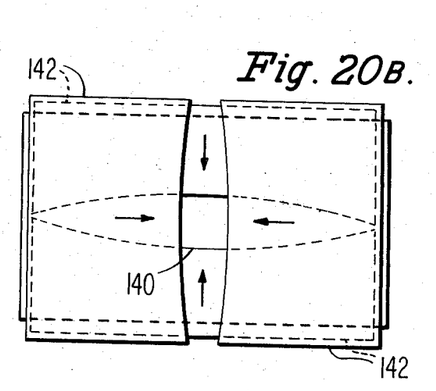
FIG. 20B is a plan view of the blades of FIG. 20A shown in a fully closed position.
Figure 21:
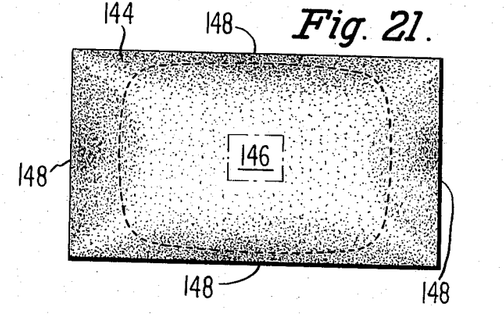
FIG. 21 is a plan view of a neutral density filter formed with the moving blades of FIGS. 20A and 20B during exposure of a photographic plate.
Figures 22, 24:
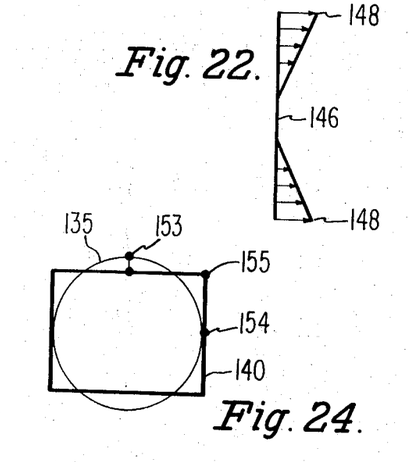
FIGS. 22 and 23, respectively, are side and bottom density curves of the filter of FIG. 21.
FIG. 24 represents the overlay areas of circular and rectangular grades.
Figure 23:
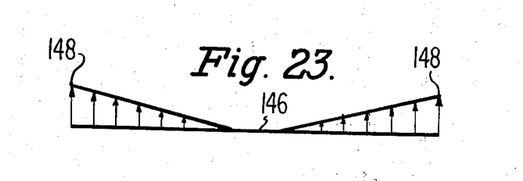

A rectangular or modified rectangular grade can be achieved by combining a dual linear grading device with a rotating shutter. In embodiments shown in FIGS. 18 through 25, the dual linear grading device varies the exposure of the artwork from the outer edges of the intended dot array to a smaller area of approximately rectangular shape in the center, which receives a uniform exposure. This central area is then additionally exposed with the circular grading device to provide circular grading in the central area of the artwork. The circular and rectangular grades blend at their overlapping sections as shown in the grading curves of FIGS. 19 and 24. In FIG. 19, lines 150, 151, and 152 represent the grading curves of minor axis, major axis, and the diagonal, respectively, of the mask pattern after the final exposure. Line 156 in FIG. 19 represents the flat grade achieved in the rectangular grading process as a result of the clear area 146 in the neutral density filter of FIG. 21. Line 135 of FIG. 19 represents the final circular grade in the central area as a result of the circular grade exposure. The circular grading can be achieved with a rotating shutter 132 having transparent butterfly-shaped pattern 134 and an opaque background portion 136, as shown in FIG. 18. The mask 138 to be graded is exposed through a device having four blades 142 that rectangularly vary the exposure of the filter by moving in and out. The resultant dual graded neutral density filter 144 is shown in FIG. 21. The grading curves for filter 144 are shown in FIGS. 22 and 23. It should be noted that the central portion 146 of the filter 144 is clear and that the opaqueness of the filter increases outwardly along both vertical and horizontal axes toward the edges 148 of the filter. After the outer portion of the artwork has been exposed, the inner rectangular portion is exposed through the rotating shutter 132 as shown in FIG. 25 thereby providing circular grading at the small central portion.

FIG. 24 represents the overlap of the circular grade 135 and the limit 140 of the flat inner portion 156 of FIG. 19. In FIGS. 19 and 24; 153, 154, and 155 represents the points of intersection of the circular and rectangular grades. The intersection point 153 represents the graded blend point of the minor axis; 154 represents the graded blend point of the major axis; and 155 represents the graded blend point of the diagonal axis.

An alternate method of achieving a rectangular or modified rectangular grade is to combine a rotating shutter with a linear grading device that decreases the exposure (and therefore the size of the rectangular areas or round dots) along the major and minor axes of the photoprinting master, but does not vary the exposure along the diagonals. This grading can be achieved by a neutral density filter 160 as shown in FIG. 26. The filter 160 has four darkened areas 162 at the ends of its major and minor axis and clear areas 164 along its two diagonals. The shading of the filter 160 is such that when combined with a rotating shutter, as shown in FIG. 29, the resultant photoprinting master is graded either rectangularly or in a modified rectangular fashion.

Figures 25, 26, 27, 28:
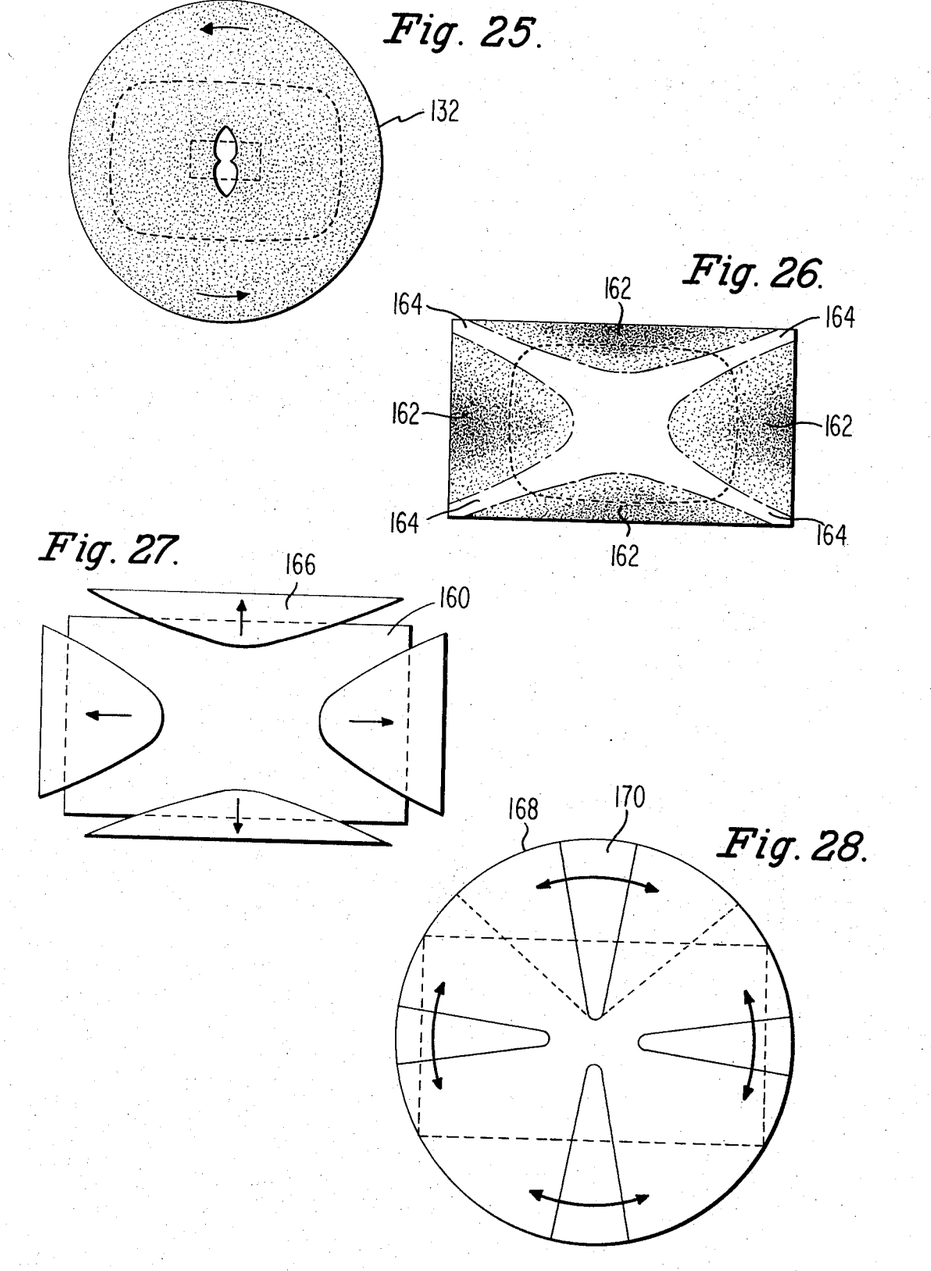
FIG. 25 is a plan view of the shutter of FIG. 18 during the exposure of a central portion of the photographic plate previously exposed by the filter of FIG. 21.
FIG. 26 is a plan view of another neutral density filter.
FIG. 27 is a plan view of a four bladed device for forming the filter of FIG. 26.
FIG. 28 is a plan view of an alternate four bladed device for forming the filter of FIG. 26.

The neutral density filter 160 of FIG. 26 can be produced in several ways. One way utilizes four linearly moving blades 166 as shown in FIG. 27 during exposure of the filter during its fabrication. Each of these blades 166 is moved outwardly thereby varying the exposure gradually from maximum in the center of the filter to a minimum at the ends of the major and minor axes.

Another way in which the filter 160 can be formed is to use an oscillating disc 168 having four spaced triangular opaque portions 170, as shown in FIG. 28. The opaque portions 170 are located at the ends of the major and minor axes of the filter and oscillate about those axes to form a gradient exposure at the end of those axes.

Figure 29:
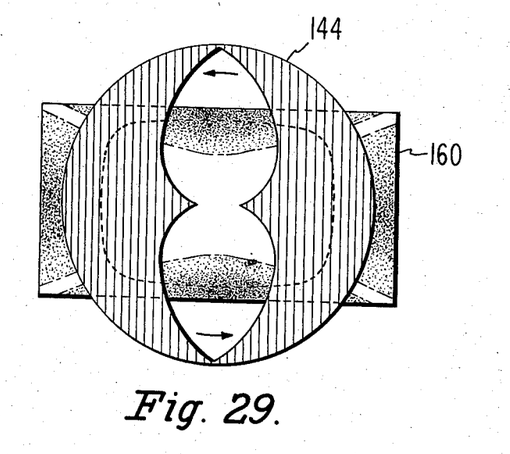
FIG. 29 is a plan view of an exposure combination using the filter of FIG. 26 and a rotatable shutter.
Figure 30:
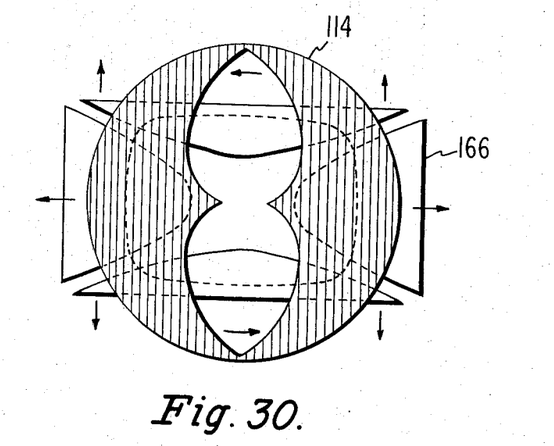
FIG. 30 is a plan view of an exposure combination using the rotatable shutter of FIG. 29 and the movable blades of FIG. 27.

Either the filter 160 or blades 166 may be combined with a rotating shutter 144 to provide exposure of a simultaneous photoprinting master as illustrated in FIGS. 29 and 30, respectively.

Several procedures may be adopted utilizing the foregoing exposure techniques. The following, however, are some of the more preferred procedures.

PROCEDURE I

Elliptical or Modified Elliptical Grade on a Single Positive Type Emulsion Plate From a Negative Master 1. A uniform small dot negative master having dots (or lines) smaller in size to that required for dots (or lines) at the edge of the diagonal of the array is prepared.

2. The negative master of step 1 is used in uniformly exposing a positive type emulsion plate (autopositive plate) which, if developed, would provide a dot (or line) size equal to or smaller than required at the edge of the diagonal.

3. Next, the plate is given a circular grade, which if developed, would provide a grade in which the dots (or lines) at each point in the grade are smaller than the dots desired for that radial position from the center of the tube, except at the edges of the minor axis. This particular grading has a gradient along all radii equal to the gradient of the desired curve along the major axis.

4. The plate is then given a linear grade which raises the exposure to all dot areas (or lines) along the major axis in equal amounts but does not affect the size of the dots (or lines) at the edge of the minor axis.

Additional procedures that may be used for forming an elliptical or modified-elliptical grade include the following wherein:

1. The circular grade on one positive type emulsion plate is followed by a rectangular grade on a second positive type emulsion from a negative master;

2. All grading on a single positive type emulsion plate is from a positive master;
3. The circular grade on one positive type emulsion plate is followed by a rectangular grade on a second positive type emulsion from a positive master;
4. All grading on a single negative type emulsion plate is from a negative master; and
5. All grading on a single negative type emulsion plate is from a positive master.

PROCEDURE II

Rectangular or Modified Rectangular Grade Wherein All Grading On A Single Positive Type Emulsion Plate Is From a Negative Master 1. A uniform small dot (or line) negative master having dots (lines) equal in size to that required at the edges of the array is prepared.
2. The rectangular master is given a uniform exposure to positive emulsion to produce an image which if developed would provide a uniform dot (or line) size equal to the size of dots (or lines) required at the edges of the array. All dots (or lines) are at the edge of the array and are equal in size.
3. Plate from Step 2 is given a rectangular grade (a dual linear grade) which, if developed, would provide a grade in which the dots (or lines) at each point in the array along the major axis, minor axis, and diagonals follow the desired grading curve up to the inner edge of the area which is given the rectangular grade.
4. The plate from Step 3 is next given a circular grade in the central area which raises the exposure to the dots (or lines) in this area of the array to approximately that required for the rectangular grade. The resulting grade follows the desired curve of the major axis exactly, but the curves of the minor axis and the diagonals are followed only approximately in the overlap region of the circular and rectangular grades. The circular grade may be extended over a larger area of the array as modified rectangular grade desired.

Additional procedures that may be used for forming a rectangular or modified-rectangular grade include the following wherein:
1. The rectangular grade on one positive type plate and the circular grade on a second positive type emulsion plate are from a negative master;
2. All grading on a single positive type emulsion plate is from a positive master;
3. The circular grade is on one positive type emulsion plate and the rectangular grade is on a second positive type emulsion plate from a positive master;
4. All grading is performed on a single negative type emulsion plate from a positive master.
5. All grading is performed on a single negative type emulsion plate from a positive master.

By utilizing the disclosed method of varying the exposure of a master in both a circular manner and a linear manner, elliptical and rectangular grading and modifications thereof of mask aperture size and ultimately phosphor element size, on a cathode ray tube screen can be achieved. Such grading can aid in producing a higher quality color television picture tube having better color uniformity.

We claim:
1. In a method of making a graded photoprinting master from an ungraded master by contact printing the ungraded master upon a photosensitive layer, the improvement in exposing the photosensitive layer comprising:
    (a) varying the degree of exposure of said photosensitive layer by exposing a first portion of said layer to light passing through a continuously rotating shutter having a specially shaped aperture to produce a desired radial variation in exposure and
    (b) varying the degree of exposure of said photosensitive layer by exposing a second portion of said layer to light passing through at least two linearly moving blades.
2. The method as defined in claim 1, wherein said second portion is exposed through two blades moving in opposite directions and wherein said first and second portions of said layer substantially comprise the entire layer, whereby the resultant grading is elliptical.
3. The method as defined in claim 1, wherein said second portion is exposed through four blades, each blade moving in a direction orthogonal to each adjacent blade, and wherein said first portion comprises the central area of said layer and said second portion comprises the remainder of said layer, whereby the resultant grading is radial with circular symmetry in said first portion and rectangular in said second portion.
4. The method as defined in claim 1, wherein said first and second portions are exposed simultaneously.
5. The method as defined in claim 1, wherein said first and second portions are exposed independently from one another.
6. In a method of making a graded photoprinting master from an ungraded master by contact printing the ungraded master upon a photosensitive layer, the improvement in exposing the photosensitive layer comprising,
    (a) varying the degree of exposure of said photosensitive layer by exposing a first portion of said layer to light passing through a continuously rotating shutter having a specially shaped aperture to produce a desired radial variation in exposure and
    (b) varying the degree of exposure of said photosensitive layer by exposing a second portion of said layer to light passing through a neutral density filter.
7. The method as defined in claim 6, wherein said neutral density filter varies in opaqueness from clear on a central horizontal axis to increased opaqueness at opposite edges and wherein said first and second portions of said layer substantially comprise the entire layer, whereby the resultant grading is elliptical.
8. The method as defined in claim 6, wherein said neutral density filter varies in opaqueness from clear in a central zone and slight opaqueness on the diagonal axes to increased opaqueness at edges of said filter along the central horizontal and vertical axes and wherein said first portion comprises an area corresponding to the clear central zone, whereby the resultant grading is radial with circular symmetry in said first portion and rectangular in said second portion.
9. The method as defined in claim 6, wherein said first and second portions are exposed simultaneously.
10. The method as defined in claim 6, wherein said first and second portions are exposed independently from one another.
11. In a method of making a graded photoprinting master from an ungraded master by contact printing the ungraded master upon a photosensitive layer, the improvement in exposing the photosensitive layer comprising,
    (a) varying the degree of exposure of said photosensitive layer by exposing a first portion of said layer to light passing through a continuously rotating shutter having a specially shaped aperture to produce a desired radial variation in exposure and
    (b) varying the degree of exposure of said photosensitive layer by exposing a second portion of said layer to light passing through four blades, said blades angularly oscillating about the center of said layer.
12. The method as defined in claim 11, wherein said first portion comprises a central area of said layer and said second portion comprises the outer area of said layer and wherein said blades oscillate about a vertical axis and a horizontal axis of said layer, whereby the resultant grading in said first portion is radial with circular sym- metry and the resultant grading in said second portion is substantially rectangular.

References Cited

UNITED STATES PATENTS

| | | | |
|---|---|---|---|
| 3,698,903 | 10/1972 | Dodd et al. | 96—44 |
| 3,674,488 | 7/1972 | Dodd et al. | 96—44 |
| 3,146,368 | 8/1964 | Fiore | 96—361 |
| 2,972,931 | 2/1961 | Roob | 355—71 |
| 2,827,390 | 3/1958 | Garrigus | 96—36.1 |
| 2,755,402 | 7/1956 | Morrell | 313—85 X |
| 2,625,734 | 1/1953 | Law | 96—35 X |
| 2,145,427 | 1/1939 | Morris | 95—64 |

RONALD H. SMITH, Primary Examiner

E. C. KIMLIN, Assistant Examiner

U.S. Cl. X.R.

96—36.1, 44, 45, 116; 355—71